(12) United States Patent
Han et al.

(10) Patent No.: US 7,382,837 B2
(45) Date of Patent: Jun. 3, 2008

(54) APPARATUS AND METHOD FOR ESTIMATING A DECISION BOUNDARY IN SYMBOL UNITS IN A MOBILE COMMUNICATION SYSTEM

(75) Inventors: Jeong-Hoon Han, Seoul (KR); Jung-Wook Yoon, Seoul (KR); Yong-Suk Moon, Suwon-si (KR); Gin-Kyu Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 628 days.

(21) Appl. No.: 10/849,218

(22) Filed: May 20, 2004

(65) Prior Publication Data

US 2004/0233976 A1    Nov. 25, 2004

(30) Foreign Application Priority Data

May 23, 2003    (KR) ...................... 10-2003-0032999

(51) Int. Cl.
*H04L 27/00* (2006.01)
(52) U.S. Cl. ..................................... 375/324; 375/355
(58) Field of Classification Search ........ 375/324–326, 375/340, 342, 343, 355, 365; 370/503, 514
See application file for complete search history.

(56) References Cited

U.S. PATENT DOCUMENTS

| | | | | |
|---|---|---|---|---|
| 5,541,967 A * | 7/1996 | Gluska et al. | ............... | 375/364 |
| 6,301,315 B1 * | 10/2001 | Li | ............................... | 375/346 |
| 6,341,147 B1 * | 1/2002 | Oak et al. | .................... | 375/341 |
| 7,092,467 B2 * | 8/2006 | Lee et al. | .................... | 375/355 |
| 7,274,757 B1 * | 9/2007 | Zhou et al. | ................. | 375/340 |
| 2003/0179838 A1 * | 9/2003 | Hamon | ........................ | 375/326 |
| 2004/0190560 A1 * | 9/2004 | Maltsev et al. | ............. | 370/503 |
| 2004/0264591 A1 * | 12/2004 | Malm et al. | ................ | 375/261 |

* cited by examiner

*Primary Examiner*—Khanh C. Tran
(74) *Attorney, Agent, or Firm*—Roylance, Abrams, Berdo & Goodman, LLP

(57) ABSTRACT

An apparatus and method for estimating a decision boundary in symbol units in a mobile communication system. The method for estimating a decision boundary of reception symbols in a receiver of a mobile communication system includes the step of calculating a preliminary decision boundary for every symbol entered a decision boundary estimator; and reflecting the preliminary decision boundary calculated for every symbol in a previous symbol's decision boundary having been calculated in consideration of a channel environment until reaching the previous symbol, and calculating a new decision boundary for the entered symbol.

28 Claims, 11 Drawing Sheets

APPARATUS AND METHOD FOR ESTIMATING A DECISION BOUNDARY IN SYMBOL UNITS IN A MOBILE COMMUNICATION SYSTEM

PRIORITY

This application claims the benefit under 35 U.S.C. § 119(a) of an application entitled "APPARATUS AND METHOD FOR ESTIMATING DECISION BOUNDARY IN SYMBOL UNITS IN MOBILE COMMUNICATION SYSTEM", filed in the Korean Intellectual Property Office on May 23, 2003 and assigned Serial No. 2003-32999, the entire contents of which are incorporated herein by reference.

BACKGROUND OF THE INVENTION

1. Field of the Invention

The present invention relates to a mobile communication system, and more particularly to an apparatus and method for estimating a decision boundary of a specific signal to which a higher order modulation scheme is applied, in a receiver for use in the mobile communication system.

2. Description of the Related Art

Mobile communication systems have evolved from typical voice-centered mobile services to high-speed packet transmission services to make it possible to transmit not only voice data but also high-speed packet data. The 3rd Generation Partnership Project (3GPP2) and the 3GPP2 for use in the third-generation mobile communication standard have recently proposed a variety of high-speed packet communication systems. For example, a High Speed Downlink Packet Access (HSDPA) standardization is in progress in the 3GPP, and a Evolution Data and Voice (1xEV DV) standardization is in progress in the 3GPP2.

Typically, a digital signal transmission system is superior to an analog signal transmission system because it is less sensitive to noise, has lower distortion, and has higher transmission efficiency as compared to the analog signal transmission system. However, the digital signal transmission system has a disadvantage in that it requires a wider bandwidth and higher system complexity as compared to the analog signal transmission system. As a variety of circuit technologies have been developed, the digital signal transmission system has been widely used in a variety of communication schemes because it generates less errors and has higher reliability compared to the analog signal transmission system.

A representative example of such a digital modulation/demodulation technique capable of transmitting two-bit input signals as a single signal is a Quadrature Phase Shift Keying (QPSK) scheme. The QPSK scheme transfers an odd bit of input bits to an In-phase (I)—channel, and transfers an even bit of the input bit to a Quadrature (Q)—channel, such that a specific value '0' is changed to '−1', and other value '1' remains. In this case, the input bits each are matched with a predetermined phase and amplitude to create modulated signals. These modulated signals each are typically called a symbol.

However, in order to implement high-speed data transmission for the aforementioned wireless communication system, there has recently been proposed a higher-order modulation scheme such as an M-Quadrature Amplitude Modulation (M-QAM) scheme capable of improving a data transfer rate.

The M-QAM scheme matches input bits with a plurality of phases and amplitudes to create modulation signals, and is classified into a variety of modulation schemes (for example, 4 Quadrature Amplitude Modulation (QAM), 16QAM, 32QAM, 64QAM, 128QAM, and 256QAM, etc.) according to a modulation rate.

The 16QAM scheme included in the M-QAM scheme will hereinafter be described with reference to FIG. 1. It should be noted that the 16QAM scheme has been disclosed for illustrative purposes and therefore the present invention can also be applicable to the remaining M-QAM schemes other than the 16QAM scheme.

FIG. 1 is a diagram illustrating a constellation of a conventional 16QAM scheme.

Referring to FIG. 1, an input signal of 4 bits includes 16 values (i.e., $2^4=16$) ranging from '0000' to '1111', such that the 16 values can be mapping-processed on 16 positions contained in a complex plain. Two preceding bits from among the four bits are separated from each other according to individual quadrants contained in a complex plain, and two following bits from among the four bits are separated from each other according to four fields partitioned in a prescribed quadrant. For example, two preceding bits of all symbols contained in a first quadrant of the complex plain are assigned '00', the first quadrant is divided into four fields, and these four fields are respectively assigned '00', '01', '10', and '11' each serving as two following bits.

In this manner, a signal modulated into 16 symbols is transmitted to a receiver. The receiver demodulates the signal composed of 16 symbols into corresponding bits according to the amplitude and phase of individual symbols. Individual symbol values are determined on the basis of a specific position having an amplitude of 2A. For example, if a Q-channel amplitude is higher than the amplitude of 2A in the first quadrant of the complex plain, symbol values '0001' and '0011' are separated from each other on the basis of a specific position having an I-channel amplitude of 2A. In this case, such a boundary value (e.g., 2A) capable of distinguishing a plurality of symbols from each other is called a decision boundary.

In case of transferring the aforementioned symbols over a wireless channel environment, the symbol signals incur considerable distortion due to signal fading or noise.

Therefore, the signal mapping-processed with the aforementioned symbols may be unexpectedly higher than the decision boundary such that it could be mistaken for wrong symbols. A reception error rate is determined according to the number of wrong symbols.

Therefore, the higher-order modulation scheme such as the 16QAM scheme can enhance a data transfer rate, but it has a disadvantage in that it must estimate individual phases and amplitudes of plural symbols in order to allow the receiver to perform symbol decision whereas the QPSK scheme can discriminate between such symbols on the basis of only the phase. Therefore, there must be newly developed a technique capable of estimating more reliable and reasonable decision boundaries in consideration of signal distortion caused by channel environments.

As described above, a demodulator of the receiver adapts the decision boundary to perform soft or hard decision of symbols, and it is preferable for information related to the demodulator to be estimated from a reception signal.

Provided that there are numerous transmission symbols, they are stochastically and equally distributed on the constellation shown in FIG. 1. There has recently been proposed a variety of schemes for estimating such a decision boundary using the aforementioned characteristic, for example, a first scheme for calculating a mean absolute value by accumulating absolute values of reception symbols during a predetermined period of time, and an unbiased estimation scheme considering noise dispersion to remove a bias component caused by noise, etc.

Typically, the first scheme for calculating a decision boundary of reception symbols by acquiring a mean value of absolute values of reception signals is effectively used in the case of a high Signal to Noise Ratio (SNR), and the unbiased estimation scheme is effectively used in the case of a low SNR.

The aforementioned estimation schemes are different in terms of performance according to the SNR. Provided that a decision boundary estimation process is performed on the condition that a sufficient accumulation period has been provided, the first scheme and the unbiased estimation scheme converge on an ideal decision boundary contained in the symbol constellation of symbols.

However, the aforementioned schemes must accumulate symbols for a long period of time to estimate the decision boundary, such that they require a long processing-time to accumulate the reception symbols. In addition, if the reception symbols are unevenly created on the constellation, the aforementioned schemes may cause undesired performance deterioration.

For example, the above scheme for acquiring an amplitude level of a reception symbol by averaging absolute values of reception signals is applied to the High Speed Downlink Packet Access (HSDPA), one of the high-speed data transmission schemes, and problems associated with this exemplary scheme will hereinafter be described in detail.

First of all, the HSDPA, one of the high-speed data transmission schemes, will hereinafter be described.

The HSDPA scheme is a general term of a prescribed data transmission scheme including an High Speed-Downlink Shared Channel (HS-DSCH) serving as a downlink data channel for supporting high-speed downlink packet data transmission in a Universal Mobile Terrestrial System (UMTS) and control channels associated with the HS-DSCH. There have recently been proposed an Adaptive Modulation and Coding (AMC) scheme, a Hybrid Automatic Retransmission Request (HARQ) scheme, and an Fast Cell Select (FCS) scheme to support the HSDPA scheme, and their detailed description will herein be omitted because they have no connection with the present invention.

The HSDPA scheme transmits data over a High-Speed Physical Downlink Shared CHannel (HS-PDSCH) functioning as a traffic channel, and at the same time transmits data over a (Physical Common PIlot CHannel) (PDPICH) functioning as a pilot channel. The HS-PDSCH can transmit data, and can also transmit such data according to 16QAM and QPSK schemes. For the purpose of simplicity, it is assumed that data transmission is performed using only the 16QAM scheme.

The PCPICH is a pilot channel, and is adapted to estimate a phase of a reception signal by transmitting prescribed symbols (e.g., an operation for continuously transmitting signals of '1') between a transmitter to a receiver.

In the meantime, a narrow-band modulation signal $d_k$ of a k-th HS-PDSCH from among a plurality of HS-PDSCHs can be represented by the following Equation 1:

$$d_k(t) = \sum_{-\infty}^{\infty} A_d \cdot g_k(i) \cdot \exp[j\Phi_k(i)] \cdot u(t/T_s - i) \quad \text{[Equation 1]}$$

where, $g_k(i) = \sqrt{I_k^2 + Q_k^2}$, $|I|,|Q| \in \{A, 3A\}$, $$\Phi_k(i) = \tan^{-1}\frac{Q_k}{I_k},$$

and u(t) is a unit step function. As is well known in the art, the unit step function u(t) can be represented by the following Equation 2:

$$u(t) = \begin{pmatrix} 1, & \text{for } 0 \leq t < 1 \\ 0, & \text{otherwise} \end{pmatrix} \quad \text{[Equation 2]}$$

Referring to Equations 1 and 2, $A_d$ is a constant where an amplitude of a transmission signal is reflected, $g_k$ is an amplitude of a corresponding symbol, and $\Phi_k(i)$ is a phase of the corresponding symbol.

Spread code waveform associated with the k-th HS-PDSCH from among a plurality of HS-PDSCHs is represented by the following Equation 3:

$$c_k(t) = \sum_{-\infty}^{\infty} \exp[j\Phi_k(i)] \cdot u(t/T_c - i) \quad \text{[Equation 3]}$$

where, $\Phi_k$ is a complex channelization code, and is denoted by $\Phi_k(i) \in \{v\pi/2 + \pi/4; v=0,1,2,3\}$.

The PCPICH serving as a pilot channel for channel estimation is represented by the following Equation 4:

$$d_{cpich}(t) = \sum_{-\infty}^{\infty} A_p \cdot g_{cpich} \cdot \exp(j\pi/4) \cdot u(t/T_{cpich} - i) \quad \text{[Equation 4]}$$

Equation 4 is denoted in a manner similar to the traffic modulation signal of the HS-PDSCH shown in Equation 1. As can be seen from Equation 4, the PCPICH continuously transmits specific symbol signals, such that the reference character 'g' indicative of an amplitude and the reference character '$\Phi_k$' indicative of a phase are denoted by constants, respectively. For example, 'g' may be set to '$g_{cpich}$' and '$\Phi_k$' may be set to $\pi/4$. The other reference character '$A_p$' is a constant for reflecting an amplitude of a transmission signal associated with a pilot signal in the same way as in '$A_d$'.

Similarly to the spread code waveform associated with the HS-PDSCH, spread code waveform of the PCPICH is denoted in a manner similar to the traffic modulation signal, and different code values are assigned to individual channels. In this case, codes assigned to individual channels are orthogonal codes as well known in the art. In conclusion, the spread code waveform of the PCPICH can be represented by the following Equation 5:

$$c_{cpich}(t) = \sum_{-\infty}^{\infty} \exp[j\Phi_{cpich}(i)] \cdot u(t/T_{cpich} - i) \quad \text{[Equation 5]}$$

where, $g_{cpich}$ is an amplitude of the PCPICH, and $T_{cpich}$ is a symbol period.

Provided that one HS-PDSCH and one PCPICH are transmitted over a transmitter, a transmission signal r(t) can be represented by the following Equation 6:

$$r(t) = d_1(t) \cdot c_1(t) + d_{cpich}(t) \cdot c_{cpich}(t) \quad \text{[Equation 6]}$$

With reference to Equation 6, the modulation signal $d_t(t)$ of the HS-PDSCH is multiplied by the channelization code waveform $c_1(t)$, thereby creating a signal denoted by $d_1(t) \cdot c_1(t)$. The modulation signal $d_{cpich}(t)$ of the PCPICH is multiplied by the channelization code waveform $c_{cpich}(t)$, thereby creating the other signal denoted by $d_{cpich}(t) \cdot c_{cpich}(t)$. If the signal denoted by $d_1(t) \cdot c_1(t)$ is added to the other signal denoted by $d_{cpich}(t) \cdot c_{cpich}(t)$, there is provided the resultant signal r(t) transferred over the transmitter.

In this case, if the signal r(t) transferred over the transmitter is received in the receiver, it is affected by multi-path fading and noise, such that it can be represented by the following Equation 7:

$$r(t) = h(t) \cdot [d_1(t-\tau_1) \cdot c(t-\tau_1) + d_{cpich}(t-\tau_1) \cdot c(t-\tau_1)] n(t) \quad \text{[Equation 7]}$$

where, h(t) is a complex channel gain, $\tau_1$ is a predetermined time delay, and n(t) is a noise component added to the reception signal r(t). Typically, n(t) indicates a noise component having spectrum density of $N_o/2$.

The reception signal r(t) shown in Equation 7, that has been affected by the fading and noise and then transmitted to the receiver, is adapted to estimate a channel environment in the receiver, such that an original transmission signal is effectively demodulated.

The receiver will hereinafter be described with reference to FIG. 2.

Referring to FIG. 2, the despreader 100 despreads the reception signal r(t). In this case, the output signal z(n) of an n-th symbol that has been despread by the despreader 100 and then transmitted to the channel compensator 120 is represented by the following Equation 8:

$$z(n) = \frac{1}{T_s} \int_{T_s+\hat{\tau}}^{(n+1)T_s+\hat{\tau}} r(t) \cdot C^*(t-\hat{\tau}) dt \quad \text{[Equation 8]}$$

With reference to Equation 8, the despread output signal z(n) can be calculated by performing a convolution operation between the reception signal r(t) and the channelization code during a predetermined symbol period Ts. In this case, '*' is a complex conjugate, and $\hat{\tau}$ is an estimated time delay.

The PCPICH signal transferred to perform channel estimation is despread by the despreader 100, and is then transmitted to the channel estimator 110. The PCPICH signal $Z_{cpich}(n)$ having been despread and transmitted to the channel estimator 110 can be represented by the following Equation 9:

$$z_{cpich}(n) = \frac{1}{T_{cpich}} \int r(t) \cdot C^*_{cpich}(t-\hat{\tau}) dt \quad \text{[Equation 9]}$$

where, $z_{cpich}(n)$ is an output value of the n-th symbol of the PCPICH serving as a pilot channel.

In this case, provided that channel estimation is ideally performed and no noise occurs, $\tilde{h}(n)$ created by transmitting the n-th symbol output signal $z_{cpich}(n)$ of the PCPICH over the channel estimator 110 can be represented by the following Equation 10:

$$\tilde{h}(n) = A_p \cdot h(n) \quad \text{[Equation 10]}$$

where, $A_p$ is a constant indicative of an amplitude of a transmission signal associated with a pilot signal, and h(n) is a complex channel gain.

$\tilde{h}(n)$ generated from the channel estimator 110 performs channel estimation on a reception signal generated from the despreader 100. Specifically, the reception signal is affected by the channel environment according to the channel environment condition having been estimated by the channel estimator 110, such that a distortion component can be compensated. For example, provided that the reception signal causes an undesired phase variation of θ over a wireless environment, it can be restored to the original transmission signal by compensating with a phase value of –θ. The above signal $\tilde{h}(n)$ is applied to the channel compensator 120 and the decision boundary estimator 130. The reception signal z(n) having been despread by the despreader 110 as shown in Equation 8 performs a predetermined operation on the channel estimation value $\tilde{h}(n)$, thereby creating a channel-compensated output signal.

The output value d(n) having been channel-compensated by the channel compensator 120 can be represented by the following Equation 11:

$$d(n) = \tilde{h}^*(n) \cdot z(n) = \|h(n)\|^2 A_p A_d \cdot g(n) \quad \text{[Equation 11]}$$

A predetermined scalar product operation between a complex conjugate of the signal $\tilde{h}(n)$ generated from the channel estimator 110 and the output value z(n) of the despreader 100 is performed, resulting in a channel-compensation signal. With reference to Equation 11, channel distortion contained in the channel-estimation signal is normally compensated, such that the channel-estimation signal is composed of only four signals, i.e., h(n), $A_p$, $A_d$ and g(n).

The demodulator 140 determines a mapping position contained in the constellation in association with the n-th symbol signal d(n) generated from the channel compensator 120. In the meantime, provided that the reception signal is an ideal signal having no distortion over a wireless channel, it can be correctly determined by a specific decision boundary (e.g., 2A).

However, since the reception signal is affected by real-time distortion created over a wireless channel, it is preferable for a substantial decision boundary to be adaptively determined according to the channel environment.

Therefore, upon receiving the channel-compensation reception signal d(n) from the channel compensator 120, the decision boundary estimator 130 preferably estimates a decision boundary in consideration of channel environment. The demodulator 140 modulates reception signal d(n) into bit values according to the decision boundary estimated by the decision boundary estimator 130. For example, in case of the 16QAM scheme, the reception signal d(n) is modulated into four bits for every symbol.

Bit data demodulated by the demodulator 140 is decoded by the decoder 150. The UMTS system typically adapts a turbo decoder as a decoder.

The decision boundary estimator will hereinafter be described with reference to FIG. 3.

FIG. 3 is a detailed block diagram of the decision boundary estimator 130 shown in FIG. 2.

Referring to FIG. 3, a complex signal shown in Equation 11 has been generated from the channel estimator 120 shown in FIG. 2, and is classified into an In-phase component and a Quadrant-phase component to perform a real-number operation. In more detail, the In-phase component contained in the output signal of the channel compensator 120 is transmitted to a first absolute value calculator 200, and the Quadrant-phase component is transmitted to a second absolute value calculator 220. In the meantime, the output signal of the channel estimator 110 is a channel gain denoted by Equation 10, and is transmitted to a third absolute value calculator 240.

Upon receiving the channel-compensated output signals (i.e., In-phase and Quadrature-phase components) from the channel compensator 120, the first and second absolute value calculators 200 and 220 calculate individual absolute values of the received signals, and the first accumulator 210 and the second accumulator 230 perform an accumulation and dump operation on the calculated absolute values.

The signals having been applied to the first and second absolute value calculators 200 and 220 each include a real part and an imaginary part, and are processed while being classified according to the real part and the imaginary part. However, the signals are equivalent to the complex symbol expression, such that the same signal processing step is applied to them. Therefore, the first accumulator 210 is adapted to accumulate the absolute value of N signals having the In-phase component, and the second accumulator 230 is adapted to accumulate the absolute value of N signals having the Quadrature-phase component. The absolute-value accumulated signals created from the first and second accumulators 210 and 230 are added to each other in the adder 260, this value is divided by 4 using the ¼ divider 270, and a resultant signal is transmitted to another divider 280.

In the meantime, if the output signal of the channel estimator 110 is transmitted to the third absolute value calculator 240, the third absolute value calculator 240 numerically squares an absolute value of the received signal, and the squared signal is transmitted from the third absolute value calculator 240 to the third accumulator 250. The third accumulator 250 accumulates the received signal by N symbols, and transmits the accumulated signal Y to the divider 280.

A division operation between the two signals X and Y applied to the divider 280 is performed. In more detail, the divider 280 divides the sum value X created by accumulating the absolute value of the complex signal by the output value Y of the channel estimator 110.

In this case, the signal is generated from the channel compensator 120, and is then transmitted to the divider 280 after accumulating its own absolute value. This signal can be represented by the following Equation 12:

$$\frac{\sum_{n=1}^{N} ||||h(n)||^2 \cdot A_d \cdot A_p \cdot ||\mathrm{Re}\{g(n)\}|||| + \sum_{n=1}^{N} ||||h(n)||^2 \cdot A_d \cdot A_p \cdot ||\mathrm{Im}\{g(n)\}||||}{4}$$ [Equation 12]

With reference to Equation 12, the output signal of the channel compensator 120 is divided into a real part and an imaginary part, and its absolute value is calculated while being classified according to the real part and the imaginary part. The calculated absolute value is accumulated during a predetermined time corresponding to N symbols, and the accumulated result is divided by 4.

In the meantime, an output signal of the channel estimator 110 is applied to the decision boundary estimator 130, an absolute value of the output signal is accumulated, and the accumulated result is applied to the divider 280. In this case, the signal applied to the divider 280 is represented by the following Equation 13:

$$\sum_{n=1}^{N} ||h(n) \cdot A_p||^2$$ [Equation 13]

With reference to Equation 13, an absolute value of ĥ(n) denoted by Equation 10 is squared, the squared result is accumulated during a predetermined time corresponding to N symbols, and the accumulated result is transferred to the divider 280 in such a way that the signal denoted by Equation 13 is created.

Finally, the divider 280 divides the signal denoted by Equation 12 by the other signal denoted by Equation 13. That is, the divider 280 performs division operation on the output signal of the decision boundary estimator 130, such that the last output signal of the decision boundary estimator 130 can be represented by the following Equation 14:

$$\hat{\theta}_1 = \frac{A_d}{A_p} A$$ [Equation 14]

As described above, considering the fact that the absolute value of mean amplitudes of the real and imaginary parts converge on a specific value of 2A after the lapse of a long period of time, the decision boundary estimator 130 normalizes the sum of individual absolute values with a channel gain, and divides the normalized value by 4. The normalized value is divided by 4 because the sum of a mean value (A+3A)/2 of the real part and a mean value (A+3A)/2 of the imaginary part converges on a specific value of 4A on the condition that the value of N is sufficiently high and creation frequencies of all symbols are equal to each other.

As previously shown in FIG. 2, the output signal of the channel compensator 120 and the output signal of the decision boundary estimator 130 are transmitted to the demodulator 140, and are adapted to set up a reference amplitude for determining a symbol. Therefore, a soft-decision process of the output value of the channel compensator 120 is performed by the output value of the decision boundary estimator 130.

For reference, there are two quantization methods for symbols received over the channel, i.e., a hard decision method and a soft decision method. In more detail, data received over the channel is slightly different from a predetermined data value modulated in a transmission step. The hard decision method determines the reception data using only two levels '1' and '0' according to a predetermined reference. The soft decision method converts a baseband signal into digital data having a specific level of 2n using a soft-decision threshold value predetermined by an N-bit Analog-to-Digital Converter (ADC). There is a little difference in a coding gain according to a quantization method of the demodulated data. For example, throughput performance of a 16-level soft decision method is superior to that of the hard decision method by about 2 dB, such that most digital communication systems mainly prefer the soft decision method to the hard decision method.

Provided that the aforementioned conventional decision boundary $\hat{\theta}_1$, and the output signal z(n) are adapted as input signals and a simple metric method is adapted to calculate a soft Long Likelihood Ratio (LLR), a signal composed of 4 bits is created by demodulating a predetermined symbol. This 4-bit signal can be represented by the following Equations 15~18:

$$\Lambda^0(z(n))=I_n \qquad \text{[Equation 15]}$$

$$\Lambda^1(z(n))=Q_n \qquad \text{[Equation 16]}$$

$$\Lambda^2(z(n))=2\cdot A-|I_n| \qquad \text{[Equation 17]}$$

$$\Lambda^3(z(n))=2\cdot A-|Q_n| \qquad \text{[Equation 18]}$$

Referring to the above Equations 15~18, $\Lambda^i(z(n))$ indicates an LLR of an i-th bit of the n-th symbol. In more detail, Equation 15 indicates a first bit from among the output bits (i.e., 4 bits) associated with a single symbol, and Equation 18 indicates the last bit from among the four bits.

In this case, Equation 15 and Equation 16 indicate two preceding bits from among the above four bits, respectively, such that they are adapted to determine a quadrant of a complex plain. Equation 17 and Equation 18 indicate two following bits from among the four bits, such that they are adapted to discriminate among four fields of a predetermined quadrant. In this case, 'In' indicates an In-phase component of the n-th symbol, and is represented by the following Equation 19. 'Qn' indicates a Quadrature-phase component of the n-th symbol, and is represented by the following Equation 20.

$$I_n=Re\{z(n)\} \qquad \text{[Equation 19]}$$

$$Q_n=Im\{z(n)\} \qquad \text{[Equation 20]}$$

Since 'In' and 'Qn' are channel-compensated signals, $\Lambda^2$ can be represented by the following Equation 21 using its corresponding gain and an estimation value $\hat{\theta}_1$, of a reference level, and $\Lambda^3$ can be represented by the following Equation 22 using its corresponding gain and the estimation value $\hat{\theta}_1$ of the reference level.

$$\Lambda^2(z(n))=2\cdot\hat{\theta}_1\cdot A_p^2\cdot\|h(n)\|^2-|I_n| \qquad \text{[Equation 21]}$$

$$\Lambda^3(z(n))=2\cdot\hat{\theta}_1\cdot A_p^2\cdot\|h(n)\|^2-|Q_n| \qquad \text{[Equation 22]}$$

Finally, the aforementioned four-bit output signals associated with 16QAMs of the Equations 15, 16, 21, and 22 are applied to the decoder 150, and are then decoded by the decoder 150.

As described above, the scheme for averaging the accumulated absolute values of reception symbols and the other scheme for estimating the decision boundary using a mean accumulation value of the squared absolute value are different in performance according to a reception SNR, however, they are all designed on the assumption that transmission symbols are evenly distributed on the constellation and are then transmitted to a target object. Therefore, the conventional decision boundary estimator necessitates numerous reception symbol samples (e.g., symbols corresponding to about one packet), such that it unavoidably create an unnecessary time delay as long as a prescribed accumulation time needed for the decision boundary estimation process. Furthermore, the conventional decision boundary estimator unexpectedly incurs performance deterioration depending on the SNR.

In conclusion, the scheme for averaging the accumulated absolute value of reception symbols and the other scheme for adapting the square of the mean accumulation value each incur an undesired time delay corresponding to the accumulated samples, such that it is difficult for either one of them to be applied to hardware (e.g., an interference canceller for requesting a real-time processing) to be processed at a high speed, for example, an interference canceller for requesting a real-time processing.

SUMMARY OF THE INVENTION

Therefore, the present invention has been made in view of the above problems, and it is an object of the present invention to provide an apparatus and method for estimating in symbol units a decision boundary of a specific signal to which a higher order modulation scheme is applied, in a receiver of a CDMA mobile communication system.

In accordance with one aspect of the present invention, the above and other objects can be substantially accomplished by the provision of a method for estimating a decision boundary of reception symbols in a receiver of a Code Division Multiple Access (DMA) mobile communication system, comprising the steps of a) calculating a preliminary decision boundary for every symbol entered a decision boundary estimator; and b) reflecting the preliminary decision boundary calculated for every symbol in a previous symbol's decision boundary having been calculated in consideration of a channel environment until reaching the previous symbol, and calculating a new decision boundary for the entry symbol.

Another aspect of the present invention provides a method for estimating a decision boundary of reception symbols in a receiver of a Code Division Multiple Access (CDMA) mobile communication system, comprising the steps of a) calculating a preliminary decision boundary for every symbol entered a decision boundary estimator; and b) sequentially storing preliminary decision boundaries for every symbol in a buffer having a predetermined window size; and c) calculating preliminary decision boundaries of previous symbols containing a preliminary decision boundary of a current entry symbol stored in the buffer, and acquiring a decision boundary of the current entry symbol.

Yet another aspect of the present invention provides an apparatus for estimating a decision boundary of reception symbols in a receiver of a Code Division Multiple Access (CDMA) mobile communication system, comprising a preliminary decision boundary calculator for every symbol for sequentially receiving demodulation target symbols, and calculating a preliminary decision boundary for every symbol; and a decision boundary calculator for receiving the preliminary decision boundary for every symbol from the preliminary decision boundary calculator, reflecting the preliminary decision boundary for every symbol in a previous symbol's decision boundary having been calculated in consideration of a channel environment until reaching the previous symbol, and calculating a new decision boundary for the entry symbol.

Yet a further another aspect of the present invention provides an apparatus for estimating a decision boundary of reception symbols in a receiver of a Code Division Multiple Access (CDMA) mobile communication system, comprising a preliminary decision boundary calculator for every symbol for sequentially receiving demodulation target symbols, and calculating preliminary decision boundaries for every symbol; and a decision boundary calculator for storing the preliminary decision boundaries calculated by the preliminary decision boundary calculator by a predetermined window size, calculating preliminary decision boundaries of previous symbols containing the stored preliminary decision boundary of a current entry symbol, and acquiring a decision boundary of the current entry symbol.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
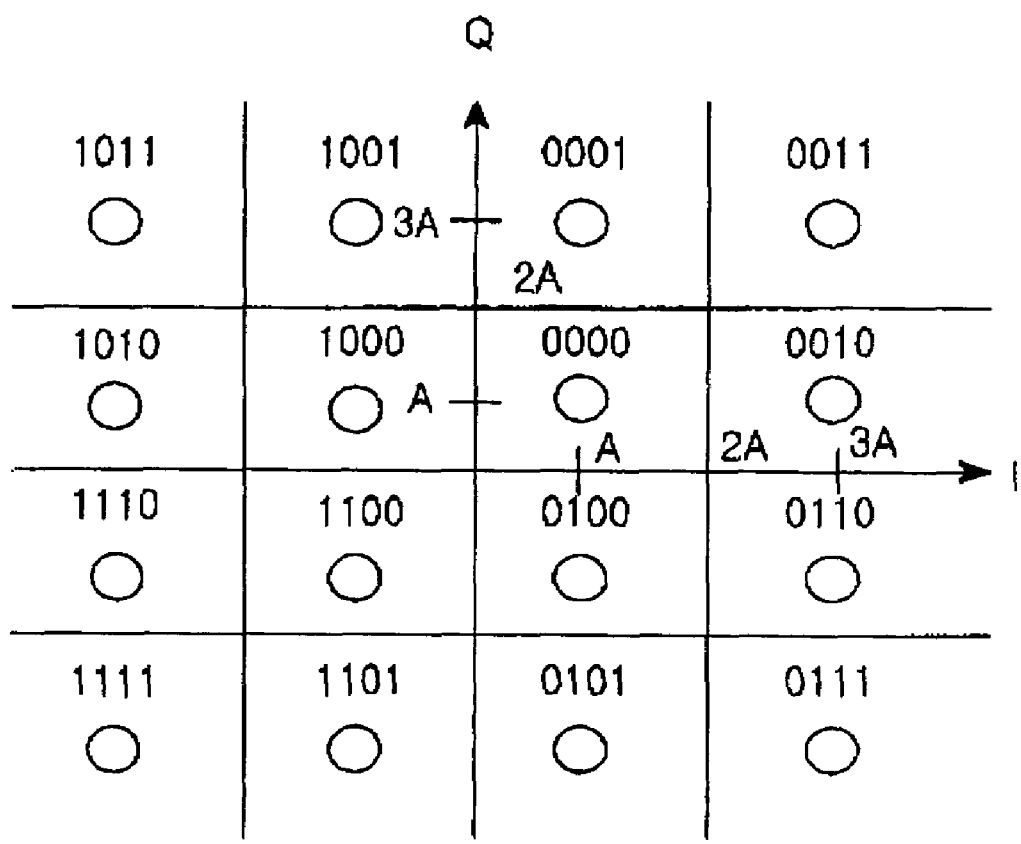
FIG. 1 is a diagram illustrating a constellation of a conventional 16QAM scheme.

Several embodiments of the present invention will be described in detail with reference to the accompanying drawings. In the drawings, the same or similar elements are denoted by the same reference numerals. In the following description, a detailed description of known functions and configurations incorporated herein will be omitted for conciseness.

A decision boundary estimator according to the embodiment of the present invention updates a decision boundary in symbol units, whereas the conventional decision boundary estimator estimates such a decision boundary by accumulating samples during a predetermined period of time for every symbol decoding. Therefore, the inventive decision boundary estimator can enhance throughput performance much more than the conventional accumulation-based estimator, and can be applicable to real-time processing hardware.

A fundamental concept of the inventive decision boundary estimator will hereinafter be described with reference to FIGS. 4a~4c. Subsequently, two embodiments of the present invention will be described in detail.

Figure 4A:
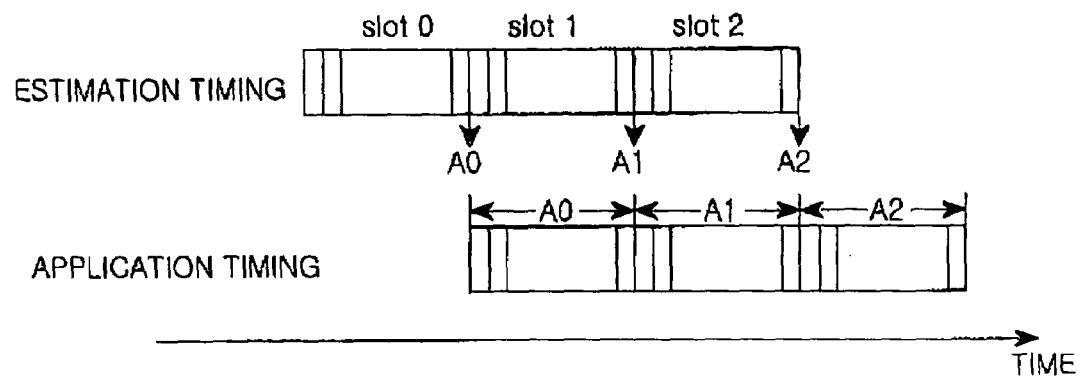
FIG. 4a is a block diagram of a conventional decision boundary estimation method using an accumulated average scheme.
Figure 4B:
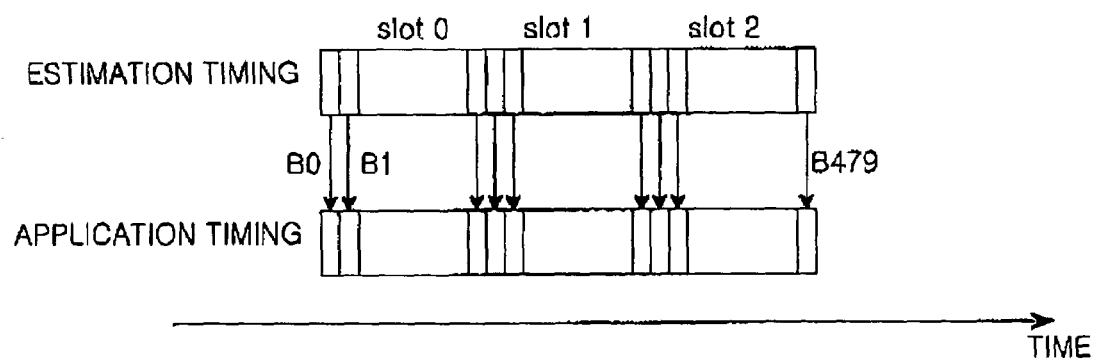
FIG. 4b is a block diagram of a decision boundary estimation method using an Infinite Impulse Response (IIR) filter in accordance with a first embodiment of the present invention.
Figure 4C:
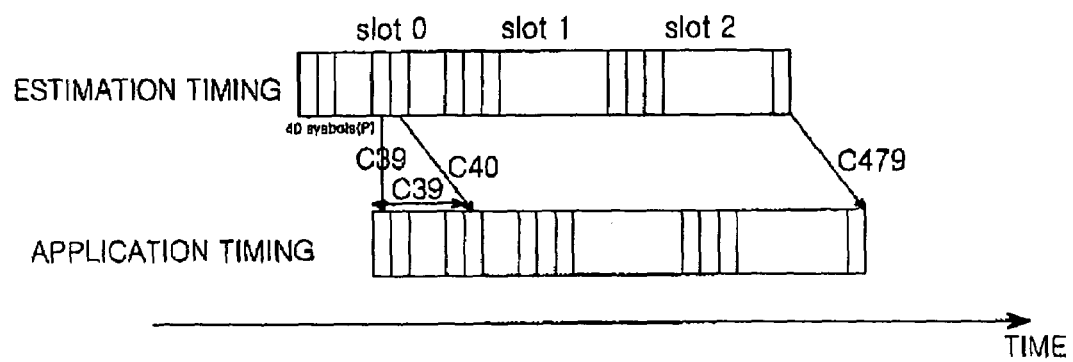
FIG. 4c is a block diagram of a decision boundary estimation method using a moving average scheme in accordance with a second embodiment of the present invention.

FIGS. 4a~4c illustrate the timing relationship between the conventional estimation method based on an accumulated average scheme and the two embodiments of the present invention for updating a decision boundary.

For example, it is assumed that the number of symbols for every slot is 160, and a frame is composed of three slots, as shown in FIGS. 4a~4c. This example is applied to a Physical Downlink Shared CHannel (PDSCH) of an High Speed Downlink Packet Access (HSDPA) system.

FIG. 4a is a block diagram of the conventional decision boundary estimation method using an accumulated average scheme.

Referring to FIG. 4a, provided that a symbol decision boundary is estimated in slot units, individual entry symbols each are delayed by one slot unit, and are then demodulated. Specifically, the conventional decision boundary estimation method receives all the symbols associated with a specific slot '0', and estimates a decision boundary to be applied to the slot '0' using all symbols of the slot '0'. Therefore, after receiving all the entry symbols for the slot '0', the entry symbols for the slot '0' are sequentially demodulated into four bits for every symbol according to an estimated specific decision boundary.

The aforementioned accumulated average scheme adapts a specific decision boundary 'A0' having been created from the last symbol timing to perform soft or hard decision of all the symbols of the slot '0'. In this manner, other slots (e.g., the slot '1', and the slot '2', etc.) are demodulated using the same method as in the slot '0'. Therefore, estimation timings and demodulation timings of all the symbols are each delayed by one slot, such that a demodulation time delay is continuously created.

Provided that reception data is demodulated in frame units, a demodulation time delay occurs by one slot for every frame composed of three slots. Each slot contains 160 symbols, such that the last output bits are delayed by 640 bit intervals, and are then demodulated.

FIG. 4b is a block diagram of a decision boundary estimation method using an IIR filter in accordance with a first embodiment of the present invention. FIG. 4c is a conceptual diagram of a decision boundary estimation method using a moving average scheme in accordance with a second embodiment of the present invention.

The decision boundary estimation method according to the first embodiment of the present invention will hereinafter be described with reference to FIG. 4b.

FIG. 4b shows the first decision boundary estimation method using the IIR filter. Decision boundaries (i.e., B0, B1, ..., B479) estimated for every symbol are applied to individual symbols (i.e., 0, 1, 2, ..., 479) in symbol units. Therefore, a hard decision or soft decision is performed on the basis of a new decision boundary generated whenever individual symbols enter, resulting in very little demodulation time delay. In addition, current entry symbol data is numerically calculated with a prior decision boundary, and the calculated result is reflected in a new decision boundary, such that the aforementioned first decision boundary estimation method can correctly respond to a real-time channel variation.

A decision boundary estimation method according to the second preferred embodiment of the present invention will hereinafter be described with reference to FIG. 4c.

FIG. 4c is a block diagram of the second decision boundary estimation method using a moving average. This second decision boundary estimation method sets up a predetermined window value, estimates a symbol decision boundary for every symbol, and applies the estimated decision boundary to individual symbols.

Referring to FIG. 4c, a decision boundary is updated for every symbol after the lapse of a predetermined time corresponding to predetermined symbols, such that symbols are demodulated without a time delay. The above decision boundary estimation method shown in FIG. 4c will hereinafter be described on the assumption that the predetermined window value is set to 40 symbols.

There is no decision boundary during a predetermined time corresponding to initial 39 symbols after a new frame has been entered. An estimation value C39 generated from the 40-th symbol is adapted as a decision boundary associated with a plurality of symbols 0~39. Then the decision boundary is updated for every symbol in such a way that the updated result is adapted to perform hard or soft decision.

According to the predetermined window size, the second decision boundary estimation method estimates a decision boundary created from symbols corresponding to the window size. The window is shifted whenever the symbols are entered, and the window-shift result is applied in real time to symbol data of predetermined prior values, such that the real-time processing result is reflected in a symbol demodulation process.

As stated above, the first and second decision boundary estimation methods according to the first and second embodiments of the present invention update a decision boundary value for every symbol, such that the influence of fading channels of individual symbols can be applied to the same timing in the case of performing hard or soft decision.

The first and second decision boundary estimation methods will hereinafter be described with reference to the accompanying drawings.

First Preferred Embodiment: Method Using IIR Filter

The decision boundary estimation method according to the first embodiment will hereinafter be described with reference to FIGS. 5 to 7.

Figure 5:
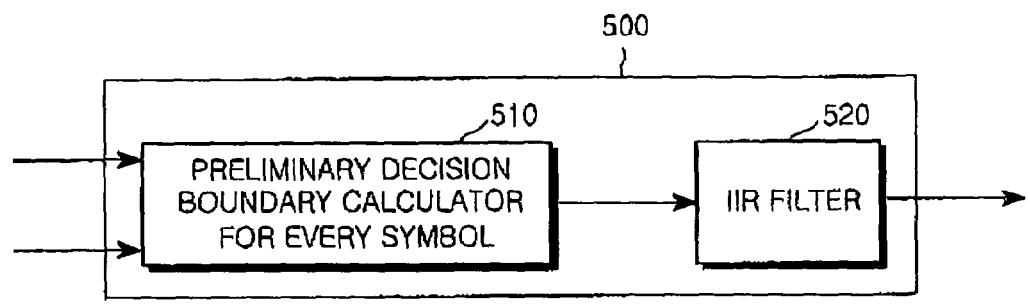
FIG. 5 is a block diagram of a decision boundary estimator in accordance with the first embodiment of the present invention.

FIG. 5 is a block diagram of a decision boundary estimator in accordance with the first embodiment of the present invention.

Referring to FIG. 5, the decision boundary estimator 130 can be replaced with a new decision boundary estimator 500 according to the first embodiment of the present invention. The decision boundary estimator 500 includes a preliminary decision boundary calculator 510 for every symbol and an IIR filter 520.

Figure 2:
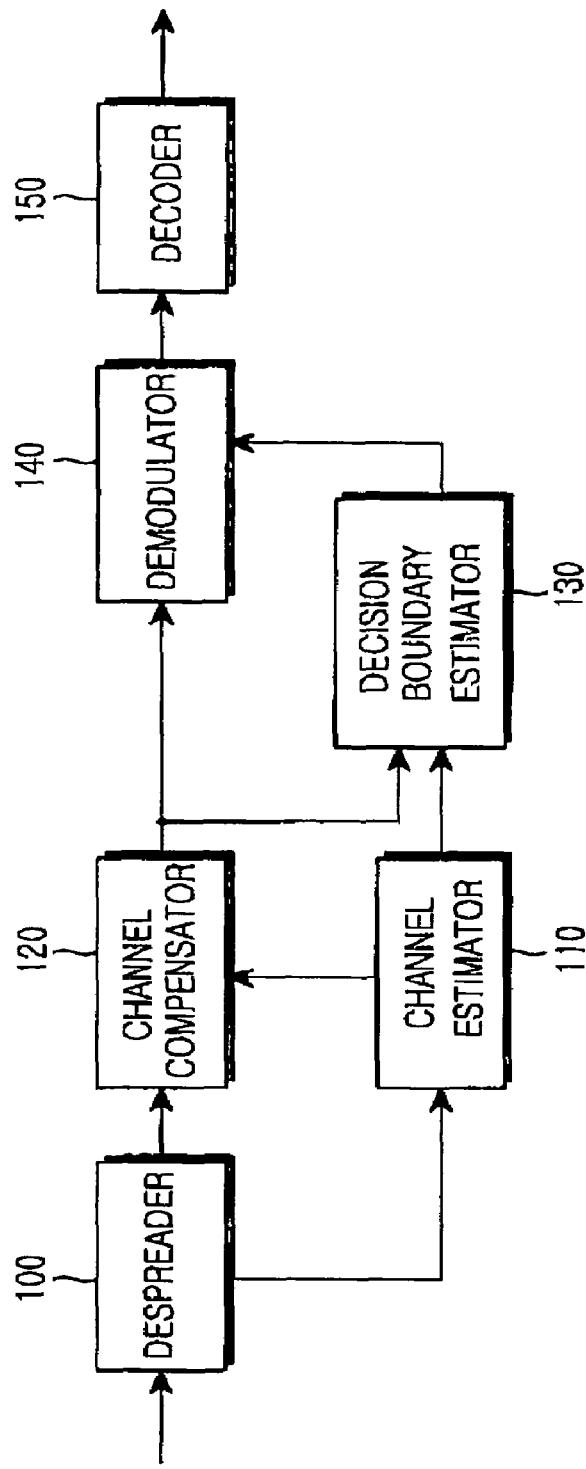
FIG. 2 is a block diagram of a receiver having a conventional decision boundary estimator.
Figure 3:
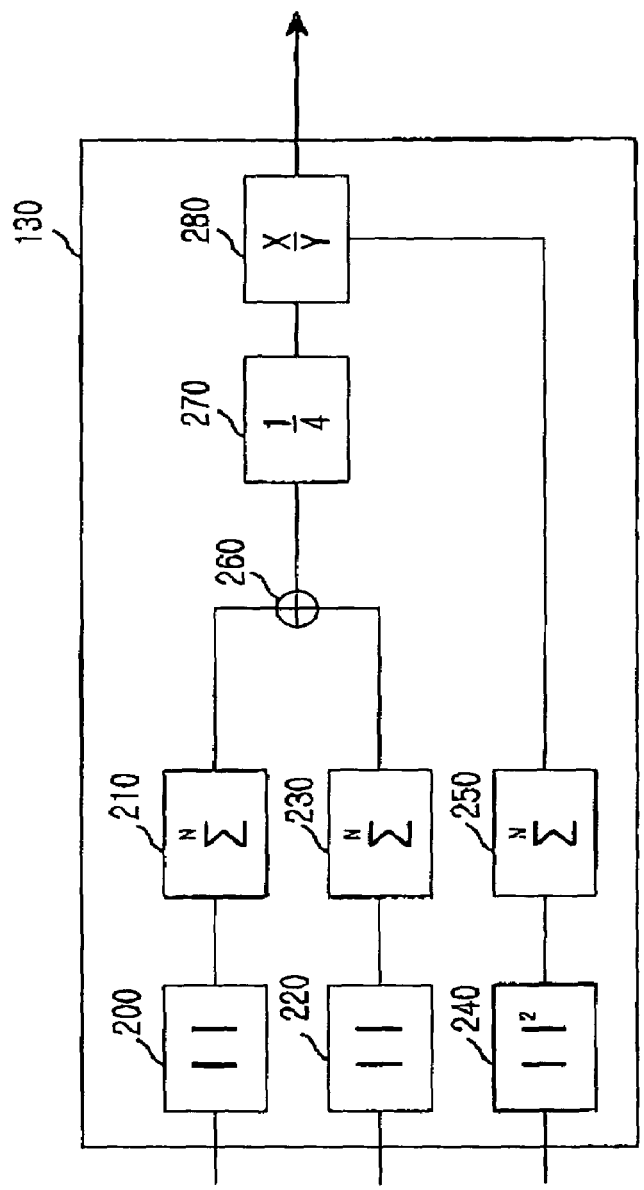
FIG. 3 is a detailed block diagram of the decision boundary estimator shown in FIG. 2.

The preliminary decision boundary calculator 510 of the decision boundary estimator 500 does not accumulate reception signals by a predetermined time corresponding to predetermined symbols, and performs calculation for every symbol, differently from the decision boundary estimator 130 shown in FIG. 2. The IIR filter 520 determines an appropriate coefficient to reflect a preliminary decision boundary of current symbol data in a previous decision boundary, such that a new decision boundary can be created.

Specifically, the preliminary decision boundary calculator 510 calculates a preliminary decision boundary for every symbol. The IIR filter 520 adds a preliminary decision boundary, that has been generated from every symbol in the preliminary decision boundary calculator 510, to a decision boundary of the previous symbol, and performs a predetermined operation on the added signal, such that a new decision boundary is generated for every symbol.

A hardware example of the decision boundary estimator 500 will hereinafter be described with reference to FIG. 6. The following hardware example of the decision boundary estimator 500 is disclosed for illustrative purposes of an embodiment of the present invention, such that it should be noted that the scope of the present invention is not necessarily limited to only a specific hardware block. That is, it is obvious that the decision boundary estimator 500 can be applicable to all hardware and software applications needed for implementing the preliminary decision boundary calculator 510 and the IIR filter 520.

Figure 6:
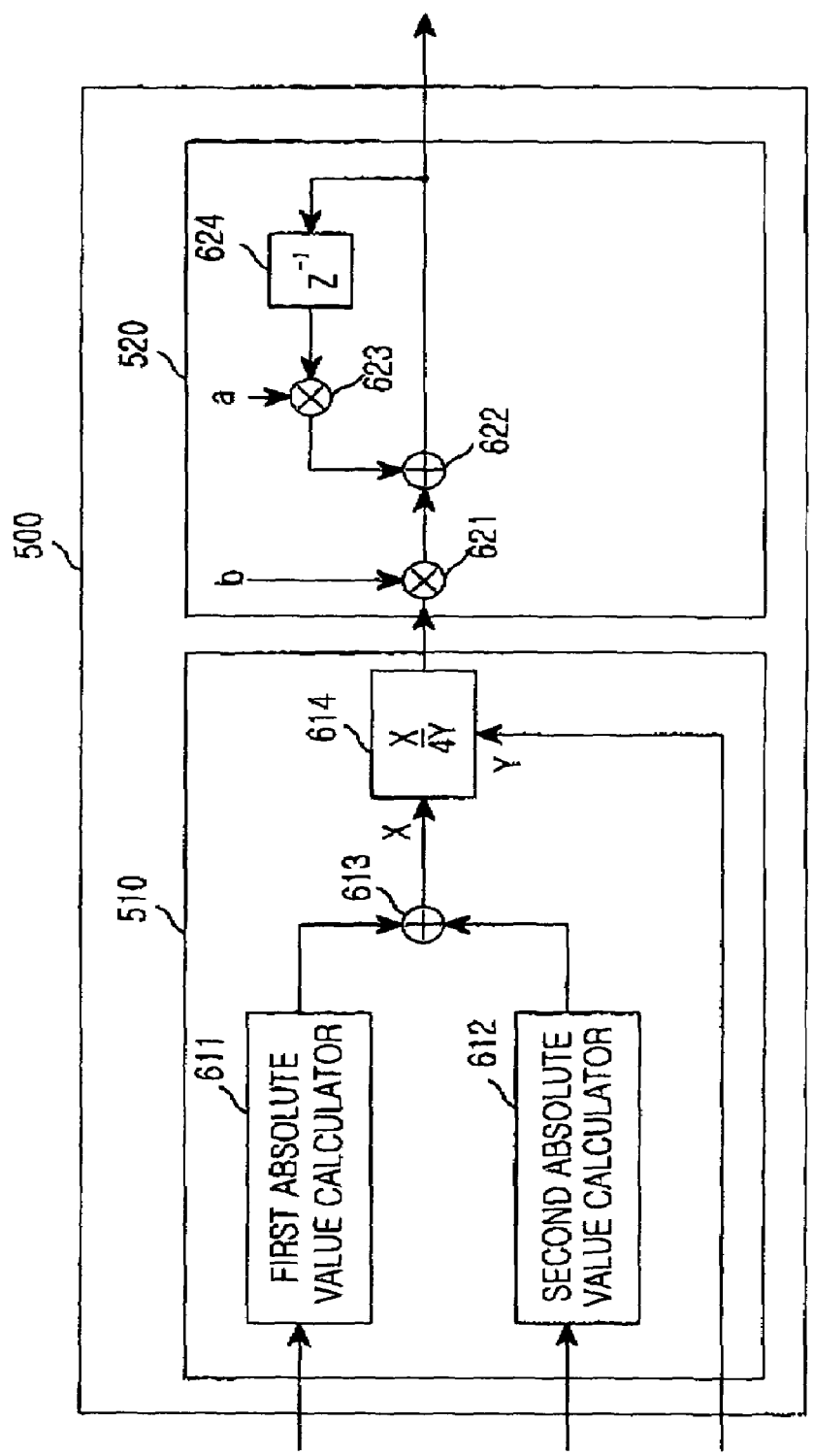
FIG. 6 is a detailed block diagram of a decision boundary estimator in accordance with the first embodiment of the present invention.

FIG. 6 is a detailed block diagram of the decision boundary estimator 500 in accordance with the first embodiment of the present invention.

Referring to FIG. 6, the decision boundary estimator 500 includes a preliminary decision boundary calculator 510 for every symbol and an IIR filter 520.

The preliminary decision boundary calculator 510 calculates a preliminary decision boundary of an entry symbol whenever it receives the entry symbol. The preliminary decision boundary calculator 510 receives an In-phase component signal and a Quadrature-phase component signal of an output symbol of the channel compensator 120, and receives an estimated channel power signal from the channel estimator 110.

The In-phase component of the output symbol of the channel compensator 120 is transmitted to the first absolute value calculator 611 of the decision boundary calculator 510, and the Quadrature-phase component is transmitted to the second absolute value calculator 612.

Upon receiving the In-phase component of the symbol from the channel compensator 120, the first absolute value calculator 611 calculates an absolute value of the received In-phase component signal. Upon receiving the Quadrature-phase component signal of the symbol from the channel compensator 120, the second absolute value calculator 612 calculates an absolute value of the received Quadrature-phase component signal. The absolute value of the In-phase component is added to the absolute value of the Quadrature-phase component by an adder 613, such that a resultant signal X is created.

The output signal X is divided by the estimated channel power signal Y generated from the channel estimator 110 in a divider 614. Therefore, the output signal of the preliminary decision boundary calculator 510 is finally denoted by X/4Y In this case, the output signal of the decision boundary calculator 510 is divided by 4 and is equal to that of the aforementioned case.

In the meantime, a preliminary decision boundary created for every symbol in the preliminary decision boundary calculator 510 is transmitted to the IIR filter 520, and a decision boundary of a current symbol is calculated using the IIR filter 520.

A fundamental concept of the IIR filter 520 can be represented by the following Equation 23:

$$\hat{\omega}(n)=a\cdot\hat{\omega}(n-1)+b\cdot\overline{\omega}(n) \quad \text{[Equation 23]}$$

where, $\hat{\omega}(n)$ is the last output value of the decision boundary estimator which does not perform a predetermined accumulated averaging process, and its detailed description will hereinafter be described. With reference to Equation 23, $\bar{\omega}(n)$ is a decision boundary for the n-th reception symbol, and reference characters 'a' and 'b' are coefficients of the IIR filter 520. In this case, 'b' can also be denoted by '1-a'. The IIR filter 520 multiplies the current preliminary decision boundary by a first predetermined coefficient, and multiplies a decision boundary of a previous symbol by a second predetermined coefficient. In more detail, if $\bar{\omega}(n-1)$ is fed back to the n-th reception symbol and a predetermined coefficient is multiplied by the feedback result signal, the last output signal $\bar{\omega}(n)$ is created.

Referring to FIG. 6, the preliminary decision boundary of the current symbol transmitted to the IIR filter 520 is multiplied by the predetermined constant 'b' in a multiplier 621. The previous decision boundary is delayed by one symbol in a delay 624, the delayed signal is multiplied by a predetermined constant 'a' in a multiplier 623, and then the multiplied signal is added to the output signal of the multiplier 621 in the adder 622.

In this case, the constant 'a' of the IIR filter 520 is a weight to be applied to a current value, and the constant 'b' is a weight to be applied to a previous value. In more detail, if the constant 'a' multiplied by a decision boundary of the current symbol becomes higher, this means that a weight of the current symbol becomes higher when calculating a decision boundary of a corresponding symbol. If the constant 'b' multiplied by the decision boundary of the previous symbol becomes higher, this means that a higher weight is assigned to data associated with previous symbols when calculating a decision boundary of a corresponding symbol. Therefore, provided that a system engineer appropriately determines the above constants, the engineer can effectively estimate a decision boundary according to a channel environment variation.

$\bar{\omega}(n)$ is adapted as a decision boundary for hard or soft decision of the n-th symbol. In this case, if an LLR serving as an entry signal of the channel decoder 150 is calculated using the simple metric method and the above estimated value, the resultant signal can be represented by the following Equations 24 to 27:

$$\Lambda^0(z(n)) = I_n \quad \text{[Equation 24]}$$

$$\Lambda^1(z(n)) = Q_n \quad \text{[Equation 25]}$$

$$\Lambda^2(z(n)) = 2 \cdot \bar{\omega}_1(n) \cdot A_p^2 \cdot \|h(n)\|^2 - I_n \quad \text{[Equation 26]}$$

$$\Lambda^3(z(n)) = 2 \cdot \bar{\omega}_1(n) \cdot A_p^2 \cdot \|h(n)\|^2 - Q_n \quad \text{[Equation 27]}$$

With reference to Equations 24 to 27, if the simple metric method is used, $\Lambda^0$ and $\Lambda^1$ indicate two preceding bits from among output bits for every symbol, and $\Lambda^2$ and $\Lambda^3$ indicate two following bits from among the output bits for every symbol, such that it can be recognized that a decision boundary is updated in symbol units.

With reference to the comparison between Equation 21 and Equation 22, it can be recognized that an output signal of the decision boundary estimator is changed from a packet-based signal to a symbol-based signal.

The inventive method for use in the first preferred embodiment of the present invention will hereinafter be described with reference to FIG. 7.

Figure 7:
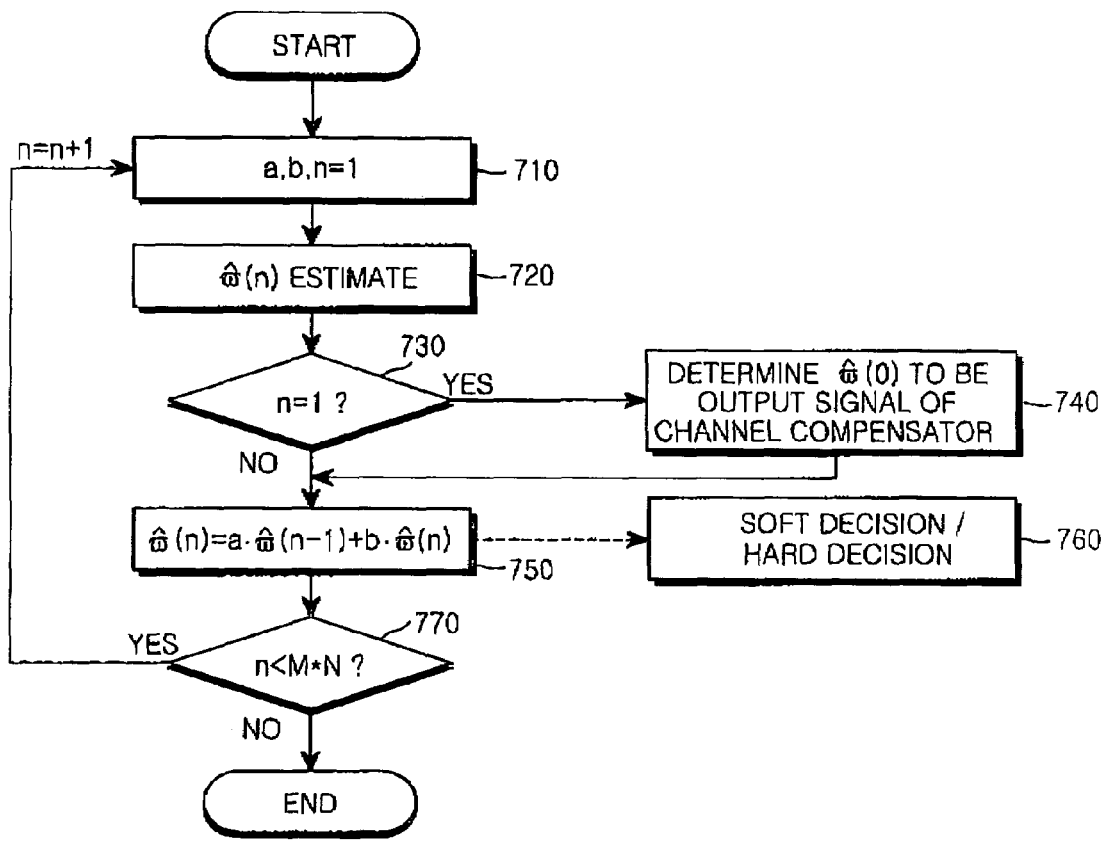
FIG. 7 is a flow chart illustrating a decision boundary estimation procedure in accordance with the first embodiment of the present invention.

FIG. 7 is a flow chart illustrating a decision boundary estimation procedure in accordance with the first embodiment of the present invention.

Referring to FIG. 7, the constants 'a' and 'b' for the IIR filter 500 are determined at step 710. Provided that symbols are demodulated in frame units, 'n' is set to an initial value '1' to count the number of symbols of a predetermined frame at step 710. 'n' having the initial value '1' increases one by one in symbol units whenever a symbol enters the decision boundary estimator.

Individual entry symbols for a predetermined frame estimate the decision boundary $\bar{\omega}(n)$ using the above method at step 720, and reflect the estimated decision boundary $\bar{\omega}(n)$ in a demodulation process.

If the entry symbol is a first symbol of a corresponding frame at step 730 (i.e., n=1), there is no decision boundary for previous symbol data, $\bar{\omega}(0)$ is set to an output value of the channel estimator 120 at step 740.

In the meantime, the previous decision boundary $\bar{\omega}(0)$ for the initial symbol data may also be determined using a variety of methods. For example, if packets are successively received, a decision boundary having been stored when demodulating the last symbol in a previous packet reception process may be used.

A decision boundary for every entry symbol is calculated using Equation 23 at step 750. The demodulator 140 performs a hard or soft decision according to the calculated decision boundary for every symbol, and individual symbols are demodulated into bit data at step 760.

The step for estimating a decision boundary of each symbol is performed for every symbol. If it is determined that a decision boundary of the last symbol is completely estimated at step 770, the decision boundary estimation process shown in FIG. 7 is terminated. In this case, provided that M is the number of slots included in a single frame and N is the number of symbols for every slot, a single entry frame is composed of M×N symbols. Therefore, if N is equal to M×N, this indicates that the decision boundary estimation process is performed on all the symbols contained in a predetermined entry frame.

Second Embodiment: Method Using Moving Window

A decision boundary estimation method according to the second embodiment of the present invention will hereinafter be described with reference to FIGS. 8 to 10.

Figure 8:
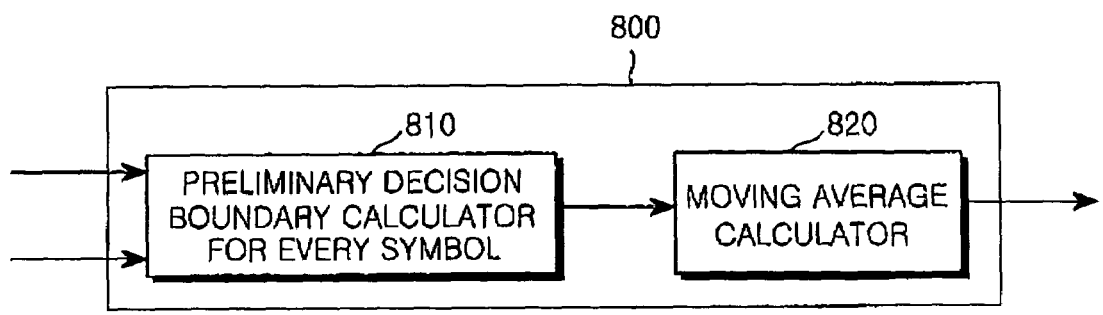
FIG. 8 is a block diagram of a decision boundary estimator in accordance with the second embodiment of the present invention.

FIG. 8 is a block diagram of a decision boundary estimator in accordance with the second embodiment of the present invention.

Referring to FIG. 8, the decision boundary estimator 130 can be replaced with a new decision boundary estimator 800 according to the second embodiment of the present invention. The decision boundary estimator 800 includes a preliminary decision boundary calculator 810 for every symbol and a moving average calculator 820.

The preliminary decision boundary calculator 810 of the decision boundary estimator 800 does not accumulate reception signals by a predetermined time corresponding to predetermined symbols, and performs calculation for every symbol, differently from the decision boundary estimator 130 shown in FIG. 2. The moving average calculator 820 reflects current symbol data in every entry symbol to calculate a new decision boundary.

In more detail, the preliminary decision boundary calculator 810 calculates a preliminary decision boundary for every symbol. Whenever the moving average calculator 820 receives a predetermined symbol, it reflects the calculated preliminary decision boundary for every symbol in previous decision boundaries corresponding to a predetermined window size, and performs a predetermined operation, such that a new preliminary decision boundary is generated for every symbol.

A hardware example of the decision boundary estimator 800 will hereinafter be described with reference to FIG. 9. The following hardware example of the decision boundary estimator 800 is disclosed for illustrative purposes of an embodiment of the present invention, such that it should be noted that the scope of the present invention is not necessarily limited to only a specific hardware block. That is, it should be appreciated that the decision boundary estimator 800 can be applicable to all hardware and software applications needed for implementing the preliminary decision boundary calculator 810 for every symbol and the moving average calculator 820.

Figure 9:
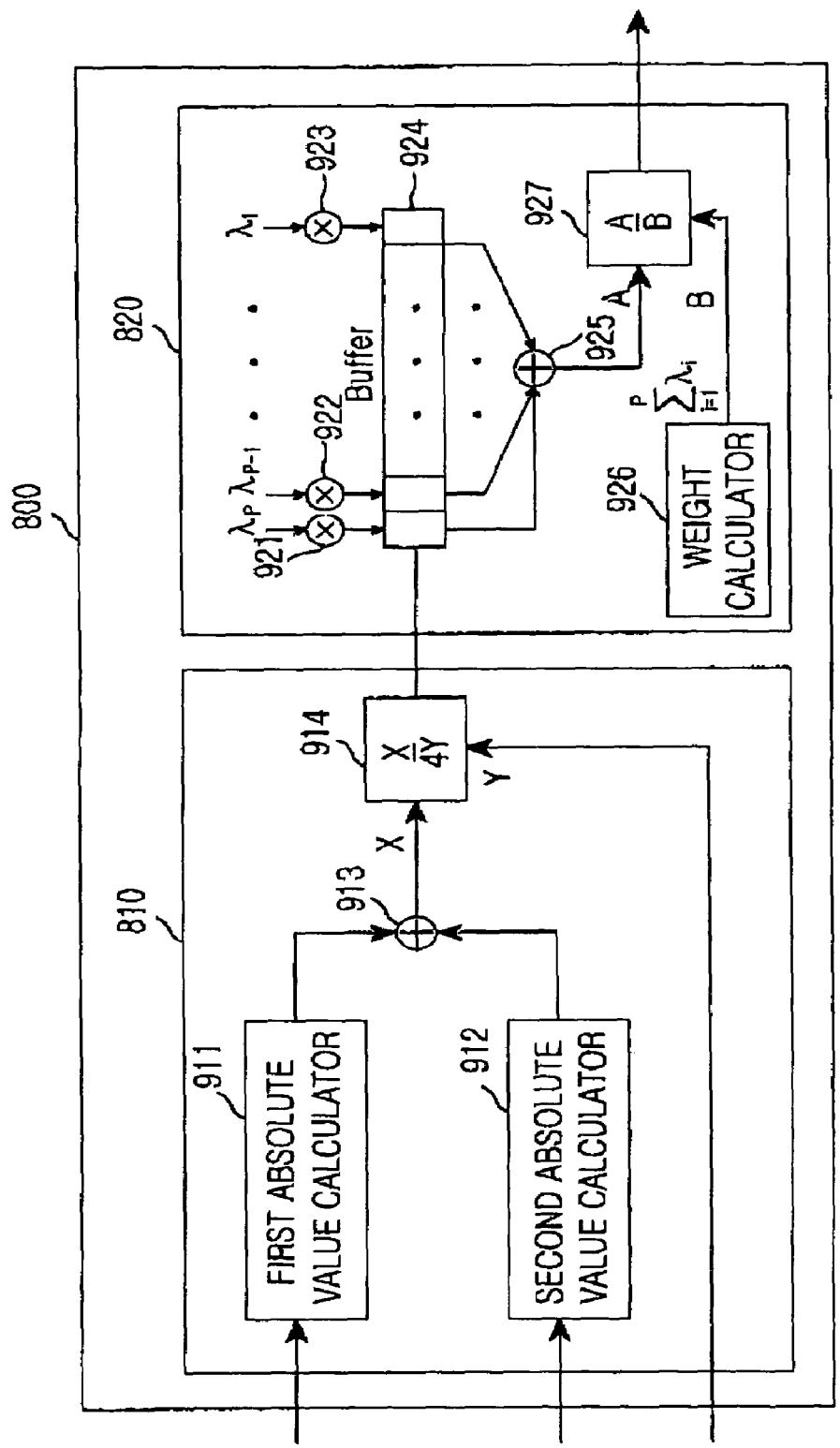
FIG. 9 is a detailed block diagram of a decision boundary estimator in accordance with the second embodiment of the present invention.

FIG. 9 is a detailed block diagram of the decision boundary estimator 800 in accordance with the second embodiment of the present invention.

Referring to FIG. 9, the decision boundary estimator 800 includes the preliminary decision boundary calculator 810 for every symbol and the moving average calculator 820.

The preliminary decision boundary calculator 810 calculates a preliminary decision boundary of an entry symbol whenever it receives the entry symbol. The preliminary decision boundary calculator 810 receives an In-phase component signal and a Quadrature-phase component signal of an output symbol of the channel compensator 120, and receives an estimated channel power signal from the channel estimator 110.

The In-phase component of the output symbol of the channel compensator 120 is transmitted to the first absolute value calculator 911 of the decision boundary calculator 810, and the Quadrature-phase component is transmitted to the second absolute value calculator 912.

Upon receiving the In-phase component of the symbol from the channel compensator 120, the first absolute value calculator 911 calculates an absolute value of the received In-phase component. Upon receiving the Quadrature-phase component signal of the symbol from the channel compensator 120, the second absolute value calculator 912 calculates an absolute value of the received Quadrature-phase component. The absolute value of the In-phase component is added to the other absolute value of the Quadrature-phase component by an adder 913, such that a resultant signal X is created.

The output signal X is divided by the estimated channel power signal Y generated from the channel estimator 110 in a divider 914. Therefore, the output signal of the preliminary decision boundary calculator 810 is finally denoted by X/4Y. The reason why the output signal of the preliminary decision boundary calculator 810 is divided by 4 is equal to that of the aforementioned case.

In the meantime, a preliminary decision boundary created for every symbol in the preliminary decision boundary calculator 810 is transmitted to the moving average calculator 820, and a decision boundary for a current symbol is calculated using the moving average calculator 820.

Specifically, if preliminary decision boundaries calculated for individual symbols are sequentially stored in a buffer 924 by a predetermined window size, a current decision boundary $\hat{\Phi}(n)$ for the n-th reception symbol is calculated using the stored preliminary decision boundaries corresponding to the predetermined window size.

Referring to FIG. 9, a preliminary decision boundary for a current symbol transmitted to the moving average calculator 920 and preliminary decision boundaries for P-1 symbols having been previously received are sequentially stored in a buffer having a predetermined window size of P. Whenever preliminary decision boundaries for the specific symbol are transmitted to the moving average calculator 920, preliminary decision boundaries for previous symbols having been stored in the buffer are shifted one by one to the next storage area. For example, as shown in FIG. 9, the preliminary decision boundary having entered a p-th storage area is sequentially shifted to (P-1)-th, (P-2)-th, . . . , and 1st storage areas whenever one symbol enters. In more detail, a decision boundary for a current entry symbol is determined by calculating P symbol boundaries from a preliminary decision boundary of a current entry symbol to a preliminary decision boundary of the (P-1)-th symbol.

Upon receipt of a predetermined entry symbol, decision boundaries for the entry symbol are multiplied by a predetermined weight $\lambda_i$ in multipliers 921, 922 and 923. The preliminary decision boundaries multiplied by the weight $\lambda_i$ are summed up by an adder 925.

P weights multiplied by P windows are summed up by a weight calculator 926, such that the summed value B is denoted by $$\sum_{i=1}^{P} \lambda_i.$$

A divider 927 divides the preliminary decision boundaries having received the summed weight from the adder 925 by a weight component calculated by the weight calculator 926. In other words, if the output signal of the adder 925 is A and the output signal of the weight calculator 926 is B, the last output signal of the moving average calculator 820 is A/B.

The decision boundary $\hat{\Phi}(n)$ being the last output value can be represented by the following Equation 28:

$$\hat{\Phi}(n) = \frac{\sum_{i=1}^{p} \lambda_i \hat{\omega}_{(n-1)+1}}{\sum_{i}^{p} \lambda_i}, P \le n \quad \text{[Equation 28]}$$

where, $\hat{\omega}(n)$ is a decision boundary of the n-th reception symbol, $\lambda_i$ is a weight to be applied to the preliminary decision boundary of the i-th symbol, p is the size of a window interval, and n is a symbol index.

As can be seen from Equation 28, if the weight $\lambda_i$ is fixed to '1', the output signals of all decision boundaries contained in the window interval are weighted with the same weight according to the above simple moving average calculation method, such that a mean value of the decision boundaries can be calculated.

If $\hat{\Phi}(n)$ calculated for the n-th symbol is applied to Equations 26 and 27, a decision boundary is updated in symbol units.

As stated above, the decision boundary $\hat{\Phi}(n)$ is adapted as a decision boundary for hard or soft decision of the n-th symbol. If the LLR serving as an entry signal of the channel decoder 150 is calculated using the simple metric method and the above estimated value, the resultant signal can also be represented by the above Equations 24 to 27:

As can be seen from $\Lambda^0$ and $\Lambda_1$ indicative of two preceding bits and $\Lambda^2$ and $\Lambda^3$ indicative of two following bits in Equations 24 to 27, it can be recognized that a decision boundary is updated in symbol units.

With reference to the comparison between Equation 21 and the Equation 22, it can be recognized that an output signal of the decision boundary estimator is changed from a packet-based signal to a symbol-based signal.

The inventive method for use in the second embodiment of the present invention will hereinafter be described with reference to FIG. 10.

Figure 10:
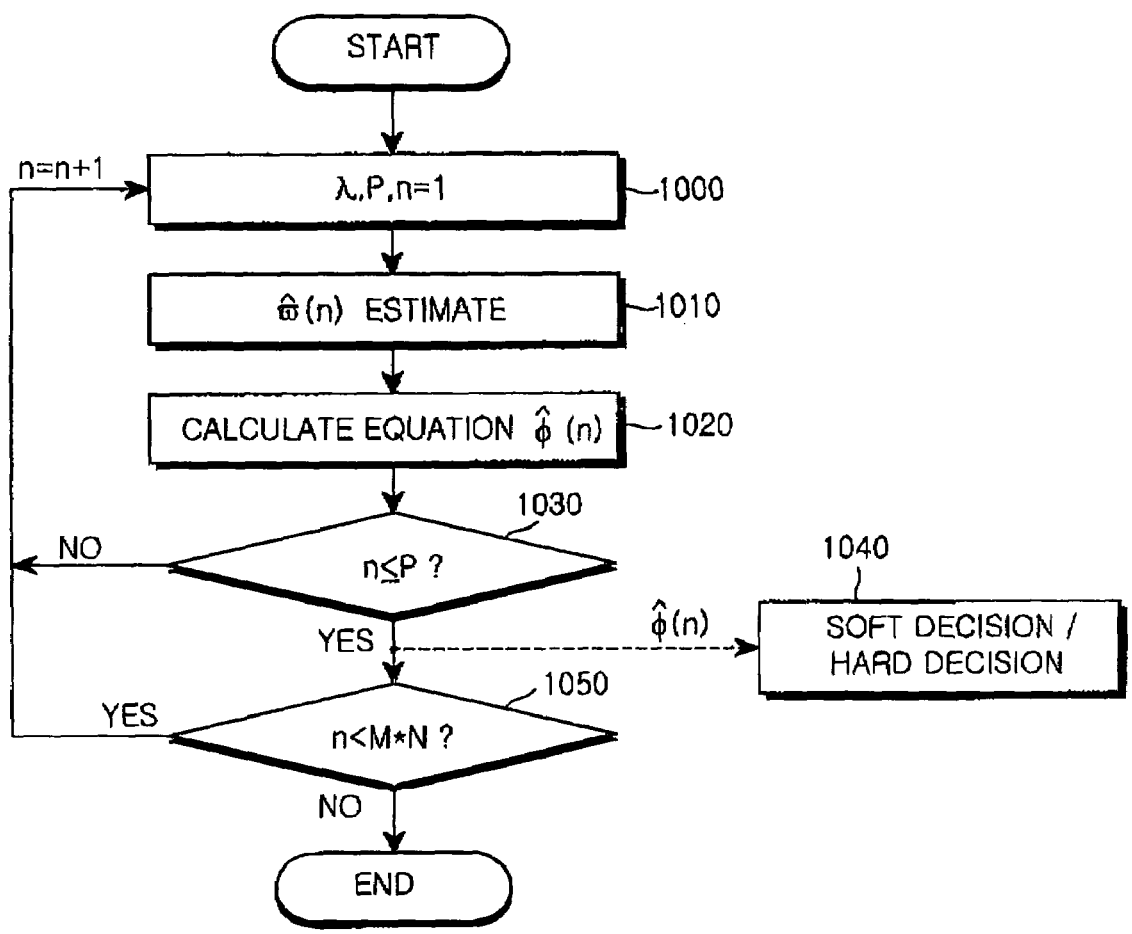
FIG. 10 is a flow chart illustrating a decision boundary estimation procedure in accordance with the second embodiment of the present invention.

FIG. 10 is a flow chart illustrating a decision boundary estimation procedure in accordance with the second embodiment of the present invention.

Referring to FIG. 10, the constants λ and p are determined at step 1000. Provided that symbols are demodulated in frame units, 'n' is set to an initial value '1' to count the number of symbols of a predetermined frame at step 1000, and 'n' having the initial value '1' increases one by one in symbol units whenever a symbol enters the decision boundary estimator.

Individual entry symbols for a predetermined frame calculate a preliminary decision boundary $\hat{\omega}(n)$ of a predetermined entry symbol using the above method at step 1010, and finally calculate a decision boundary $\hat{\Phi}(n)$ at step 1020.

Specifically, individual preliminary decision boundaries of the symbols having been sequentially stored in a buffer having a predetermined window size are multiplied by the weight λ, the multiplied values are summed up, and the summed result is divided by the sum of individual weights in such a way that a mean value considering weights of the decision boundaries can be calculated, resulting in the decision boundary $\hat{\Phi}(n)$.

If a predetermined condition of $n \leq p$ is provided at step 1030 and the number of entry symbols is lower than the window size P, this indicates that the calculated decision boundary is not reliable, such that the next symbol needs to enter the decision boundary estimator. In this manner, if the number of entry symbols is equal to the window size, symbols for a predetermined frame sequentially determine the decision boundary $\hat{\Phi}(n)$ using the aforementioned method.

The demodulator 140 performs soft or hard decision on the basis of the decision boundary calculated for every symbol after the p-th symbol has been entered, such that individual symbols are demodulated into bit data at step 1040.

The above step for estimating a decision boundary of each symbol is performed for every symbol. If it is determined that a decision boundary of the last symbol is completely estimated at step 1050, the decision boundary estimation process is terminated.

In this case, provided that M is the number of slots contained in a single frame and N is the number of symbols for every slot, a single entry frame is composed of M×N symbols. Therefore, if N is equal to M×N, this means that the decision boundary estimation process is performed on all symbols of a predetermined entry frame.

EXPERIMENTAL EXAMPLE

The experimental results of the first and second embodiments will hereinafter be described with reference to FIG. 11.

Figure 11:
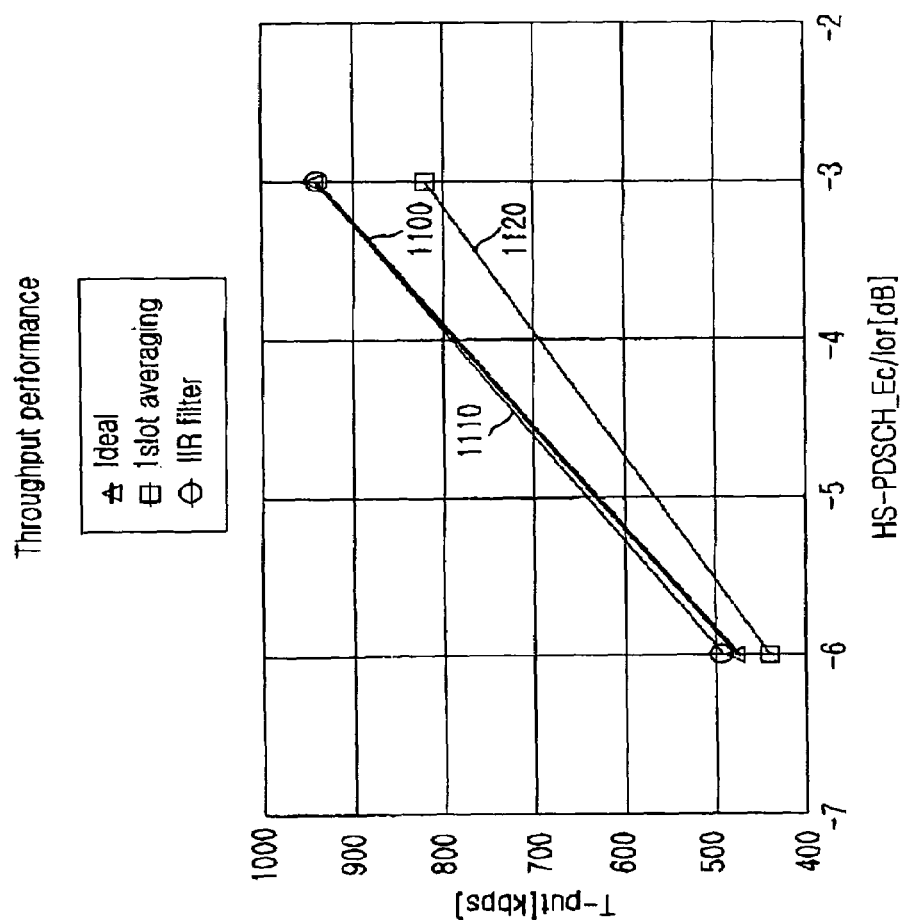
FIG. 11 is a graph illustrating the comparison result between individual performances of the decision boundary estimation methods in accordance with an embodiment of the present invention.

FIG. 11 is a graph illustrating the comparison result between individual performances of the decision boundary estimation methods in accordance with the first and second embodiments of the present invention.

Prescribed conditions for implementing the experimental example called a simulation will hereinafter be described in detail. All the experimentations are performed using a floating point simulation, and their performances are compared with throughput performance of a rake receiver. The Fixed Reference Channel (FRC H)-Set 3 16 Qaudrature Amplitude Modulation (QAM) scheme prescribed in the Third Generation Partnership Project Technical Specification (3GPP TS) 25.101 which is incorporated herein by reference is used for all transmission data, and a prescribed condition of 'Pedestrian B 3 km/h' indicative of a walking speed is adapted as a channel model. The following conditions shown in Table 1 are needed for the above experimentation.

TABLE 1

| Data format | H-Set3 16 QAM |
|---|---|
| # of multi-code | 4 |
| SRRC filter | ON |
| Channel Estimation | REAL |
| Searcher & Tracker | IDEAL |

Throughput performance of the present invention is compared with that of a 1-slot averaging method on the condition that an IDEAL state has been provided. This IDEAL state indicates that the receiver has previously recognized the decision boundary.

The above 1-slot averaging method indicates a decision boundary determined by the conventional method for calculating an accumulated average for every slot. The decision boundary is updated in one slot unit according to the 1-slot averaging method.

Finally, if using the IIR filter to estimate such a decision boundary, a filter coefficient 'a' is set to 63/64, and the other filter coefficient 'b' is set to 1/64.

The simulation result data is shown in the following Table 2, and is also graphically shown in FIG. 11.

TABLE 2

| HS-PDSCH_Ec/Ior | T-put[kbps], Ior/Ioc = 10 dB | | |
|---|---|---|---|
| [dB] | Ideal | 1-slot averaging | IIR filter |
| −6 | 470.22 | 434.66 | 487.54 |
| −3 | 936.44 | 819.87 | 936.72 |

As can be seen from the above Table 2, throughput performance of the IIR filter is similar to that of the IDEAL state, but it is very different from the experimental data of the 1-slot averaging method.

With reference to FIG. 11 graphically illustrating data contained in Table 2, it can be clearly recognized that the throughput performances of the embodiments of the present invention are superior to that of the conventional art.

X-axis (i.e., a horizontal axis) shown in FIG. 11 indicates a Signal to Noise Ratio (SNR) of the HS-PDSCH channel, and Y-axis (i.e., a vertical axis) shown in FIG. 11 indicates throughput performance. The reference numeral 1100 is a plot illustrating the result of the IDEAL case, and the reference numeral 1110 is a plot illustrating the result of the IIR filter case, and the reference numeral 1120 is a plot illustrating the result of the 1-slot averaging case.

As can be clearly seen from FIG. 11, the inventive methods according to the embodiments of the present invention are superior to the conventional 1-slot averaging method. The decision boundary is updated in symbol units according to the embodiments of the present invention, such that the throughput performance of the present invention is similar to that of the above method for fixing the decision boundary to an ideal value. In the case of a low SNR, the effect of performance improvement can be clearly recognized.

In the meantime, the aforementioned inventive methods have a higher performance than the IDEAL method. In more detail, the IDEAL method is considered to be a theoretical optimum value when all the symbols are created with the same probability on the constellation, however, the probabilities of creating individual symbols on the constellation of real transmission symbols are actually different from each other, such that the inventive method for updating the decision boundary for every symbol is less affected by such different probabilities of individual symbols.

As apparent from the above description, the embodiments of the present invention have a higher performance than the conventional decision boundary estimation method based on an accumulated average scheme, and have almost the same throughput performance as that of the ideal estimator. Particularly, in the case of a low SNR, the embodiments of the present invention have higher throughput performance than the ideal estimator. The embodiments of the present invention have throughput performance higher than that of the conventional accumulated average method, and are capable of performing the high-speed data processing, such that it can be readily applicable to advanced receivers such as an interference canceller, etc.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for estimating a decision boundary of reception symbols in a receiver of a CDMA (Code Division Multiple Access) mobile communication system, comprising the steps of:
    a) calculating a preliminary decision boundary for every symbol entered via a decision boundary estimator; and
    b) for each said entered symbol, reflecting the preliminary decision boundary calculated in a previous entered symbol's decision boundary that was calculated in consideration of a channel environment until reaching the previous symbol, and calculating a new decision boundary for the said entered symbol.

2. The method as set forth in claim 1, wherein the entered symbols are modulated using a higher order modulation scheme.

3. The method as set forth in claim 2, wherein the higher order modulation method is selected from among a plurality of schemes, i.e., 4 Quadrature Amplitude Modulation (QAM), 16QAM, 32QAM, 64QAM, 128QAM, and 256QAM schemes, according to a modulation rate.

4. The method as set forth in claim 1, wherein the preliminary decision boundary for the entered symbol is calculated when absolute values of individual symbol signals are acquired and the acquired result is divided by an estimated channel power signal received from a channel estimator.

5. The method as set forth in claim 1, wherein the step (b) for calculating the decision boundary further comprises the step of:
    multiplying the preliminary decision boundary by a predetermined constant.

6. The method as set forth in claim 1, wherein the step (b) for calculating the decision boundary further comprises the step of:
    multiplying the previous entered symbol's decision boundary having been calculated in consideration of channel environment until reaching the previous entered symbol by a predetermined constant.

7. The method as set forth in claim 1, wherein the step (b) for calculating the decision boundary further comprises the step of:
    multiplying the preliminary decision boundary of a current entered symbol by a predetermined constant, delaying the previous entered symbol's decision boundary that was calculated in consideration of channel environment until reaching the previous entered symbol, by one symbol, multiplying the delayed result by the other predetermined constant, and performing predetermined calculation on the resultant value to acquire the decision boundary.

8. A method for estimating a decision boundary of reception symbols in a receiver of a Code Division Multiple Access (CDMA) mobile communication system, comprising the steps of:
    a) calculating a preliminary decision boundary for every symbol entered via a decision boundary estimator; and
    b) sequentially storing preliminary decision boundaries for each said entered symbol in a buffer having a predetermined window size; and
    c) calculating preliminary decision boundaries of previous entered symbols including a preliminary decision boundary of a current entered symbol stored in the buffer, and acquiring a decision boundary of the current entered symbol.

9. The method as set forth in claim 8, wherein the entered symbols are modulated using a higher order modulation scheme.

10. The method as set forth in claim 9, wherein the higher order modulation method is selected from among a plurality of schemes, i.e., 4 Quadrature Amplitude Modulation (QAM), 16QAM, 32QAM, 64QAM, 128QAM, and 256QAM schemes, according to a modulation rate.

11. The method as set forth in claim 8, wherein the preliminary decision boundary for the entered symbol is calculated when absolute values of individual symbol signals are acquired and the acquired result is divided by an estimated channel power signal received from a channel estimator.

12. The method as set forth in claim 8, wherein the decision boundary is calculated by assigning a weight to decision boundaries of the entered symbols stored in the buffer.

13. The method as set forth in claim 12, wherein the weight is differently assigned to preliminary decision boundaries of individual entered symbols stored in the buffer.

14. The method as set forth in claim 12, wherein the decision boundary having been calculated by considering the weight is calculated when the preliminary decision boundaries weighted with different weights for every entered symbol are summed and the summed result is divided by the sum of weights.

15. An apparatus for estimating a decision boundary of reception symbols in a receiver of a Code Division Multiple Access (CDMA) mobile communication system, comprising:
    a preliminary decision boundary calculator for sequentially receiving demodulation target symbols for each entered symbol, and calculating a preliminary decision boundary for said entered symbol; and
    a decision boundary calculator for receiving the preliminary decision boundary for each said entered symbol from the preliminary decision boundary calculator, and for each said entered symbol, reflecting the preliminary decision boundary in a previous entered symbol's decision boundary having been calculated in consideration of a channel environment until reaching the previous entered symbol, and calculating a new decision boundary for the said entered symbol.

16. The apparatus as set forth in claim 15, wherein the entered symbols are modulated using a higher order modulation scheme.

17. The apparatus as set forth in claim 16, wherein the higher order modulation method is selected from among a plurality of schemes, i.e., 4 Quadrature Amplitude Modulation (QAM), 16QAM, 32QAM, 64QAM, 128QAM, and 256QAM schemes, according to a modulation rate.

18. The apparatus as set forth in claim 15, wherein the preliminary decision boundary calculator for said entered symbol comprises:
   an absolute value calculator for calculating absolute values of individual entered symbol signals; and
   a divider for dividing the calculated result by an estimated channel power signal received from a channel estimator.

19. The apparatus as set forth in claim 15, wherein the decision boundary calculator is comprises an Infinite Impulse Response (IIR),
   said IIR filter including:
   a delay for delaying a decision boundary of the previous entered symbol by one symbol time duration; and
   an adder for adding the preliminary decision boundary for each said entered symbol having been calculated by the preliminary decision boundary calculator to the previous symbol's decision boundary having been received from the delay.

20. The apparatus as set forth in claim 19, wherein the IIR filter further comprises:
   a multiplier for multiplying the preliminary decision boundary for each said entered symbol having been calculated by the preliminary decision boundary calculator for each said entered symbol by a predetermined constant.

21. The apparatus as set forth in claim 19, wherein the IIR filter further comprises:
   a multiplier for multiplying the decision boundary of the previous entered symbol having been generated from the delay by a predetermined constant.

22. An apparatus for estimating a decision boundary of reception symbols in a receiver of a Code Division Multiple Access (CDMA) mobile communication system, comprising:
   a preliminary decision boundary calculator for sequentially receiving demodulation target symbols for each entered symbol, and calculating preliminary decision boundaries for each said entered symbol; and
   a decision boundary calculator for storing the preliminary decision boundaries calculated by the preliminary decision boundary calculator by a predetermined window size, calculating preliminary decision boundaries of previous entered symbols including the stored preliminary decision boundary of a current entered symbol, and acquiring a decision boundary of the current entered symbol.

23. The apparatus as set forth in claim 22, wherein the entered symbols are modulated using a higher order modulation scheme.

24. The apparatus as set forth in claim 23, wherein the higher order modulation method is selected from among a plurality of schemes, i.e., 4 Quadrature Amplitude Modulation (QAM), 16QAM, 32QAM, 64QAM, 128QAM, and 256QAM schemes, according to a modulation rate.

25. The apparatus as set forth in claim 22, wherein the preliminary decision boundary calculator for each said entered symbol comprises:
   an absolute value calculator for calculating absolute values of individual entered symbol signals; and
   a divider for dividing the calculated result by an estimated channel power signal received from a channel estimator.

26. The apparatus as set forth in claim 22, wherein the decision boundary calculator includes:
   a buffer having a predetermined window size, and sequentially storing preliminary decision boundaries calculated for individual entered symbols; and
   an adder for summing up the preliminary decision boundaries of the previous entered symbols including the preliminary decision boundary of the current entered symbol stored in the buffer.

27. The apparatus as set forth in claim 26, wherein the decision boundary calculator further comprises:
   a multiplier for multiplying the preliminary decision boundaries of individual entered symbols stored in the buffer by a predetermined weight.

28. The apparatus as set forth in claim 27, wherein the weight is assigned differently to the preliminary decision boundaries of the entered symbols.

* * * * *